May 30, 1933.  D. H. MARTIN  1,911,635
KAFIR CORN HEADING MACHINE
Filed Aug. 17, 1932
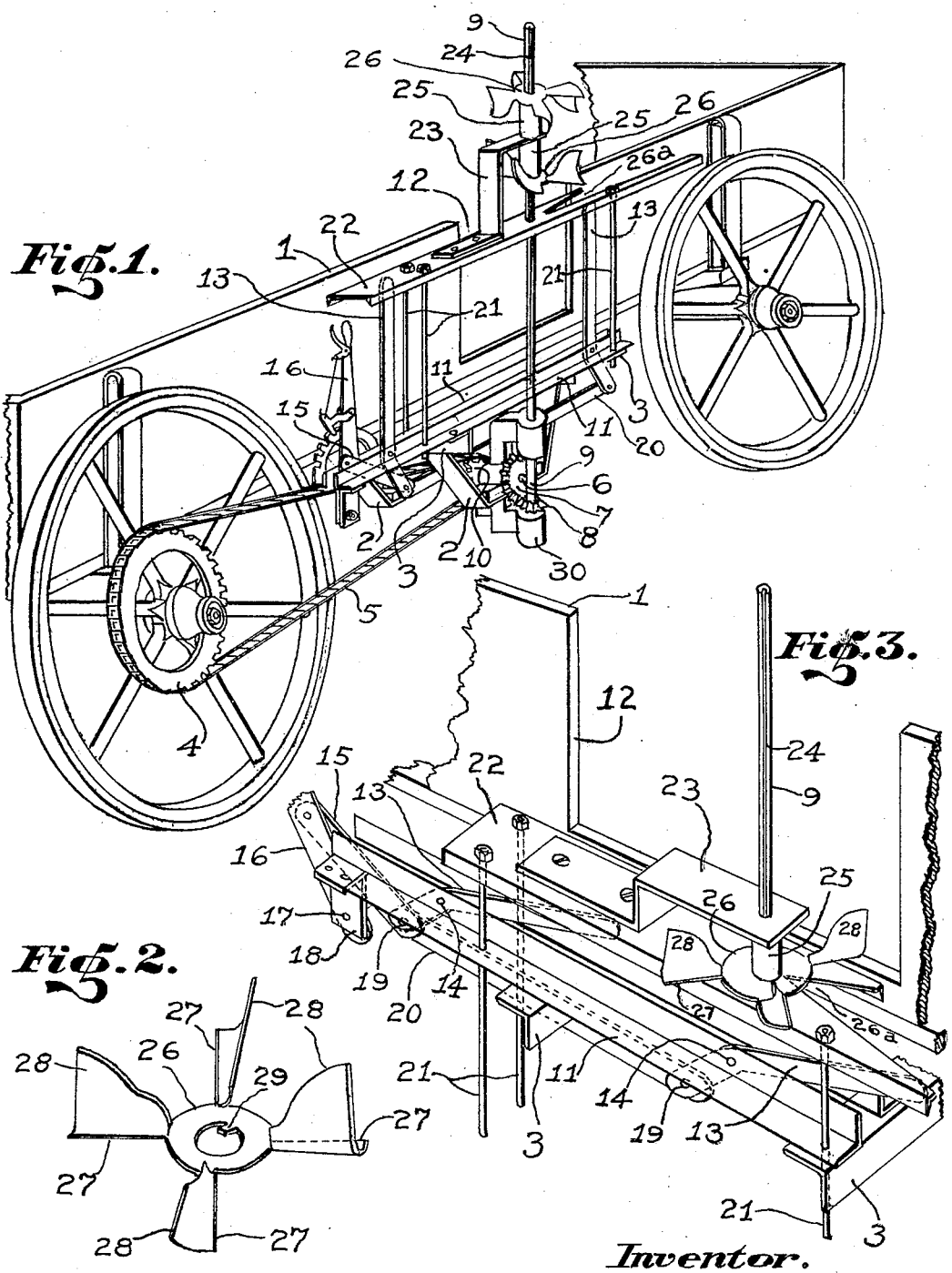

Patented May 30, 1933

1,911,635

UNITED STATES PATENT OFFICE

DAVID HENRY MARTIN, OF LECOMPTON, KANSAS

KAFIR CORN HEADING MACHINE

Application filed August 17, 1932. Serial No. 629,154.

The invention relates to improvements in kafir corn heading machines in which a single member designated as a cutter, will serve three purposes, two of which when placed in position to cut, and the remaining other purpose when placed in inverted position, as a knocker, on the same shaft above the one placed as a cutter which also is a thrower by reason of its form, to be more particularly described below.

The objects of my invention are, first, to provide a one-piece cutting and throwing member that is more easily kept adjusted to its work and is cheaper in construction, and that when inverted and placed on the same shaft above the one set for cutting and throwing it will serve as a knocker to greatly facilitate handling kafir corn that must be headed with a long stem remaining below the head; and second, to provide a means for raising and lowering the cutting and throwing assembly for cutting all lengths of stems desired to be left below the heads, in a vertical direction but with all parts remaining horizontal throughout the raising and lowering movements; and third, to provide such means that one operator can more readily handle the entire mechanism as well as do the forking of the headed kafir corn in the wagon bed to pile it so as to keep it away from the flow from the cutter and thrower to prevent clogging; and fourth, to provide means for lightening the weight to be carried so that one man can mount the machine on a conventional wagon bed from which the operating power is derived from one of its ground contacting wheels.

Other objects and advantages of my invention will become apparent from the following specification and drawing.

One form of my invention is shown in the accompanying, one sheet of drawing, forming a part of this specification and in which like numerals indicate like parts throughout the same.

Fig. 1 is a perspective view of a conventional wagon and its bed with my invention mounted thereon in position to harvest kafir corn of uneven heights of stalks.

Fig. 2 is a perspective view of the triple duty cutter that first, cuts, and, throws, the kafir corn into the wagon bed and when inverted and placed above and on the same shaft it knocks long upwardly extending stalks in unison with the cutting and throwing into the wagon bed.

Fig. 3 is a perspective view of the principal parts of my invention removed from the wagon, but adjacent a portion of the wagon bed where an opening has been cut out to provide for operating my invention in its collapsed, or lowered, form to harvest short kafir corn.

My invention, with all hoods and coverings removed to expose to view the several parts, and as mounted on the right hand side of a conventional wagon bed, sprocket 4 is secured to the outside of the right rear wheel of the wagon through sprocket chain 5 the smaller sprocket wheel is revolved in a forward direction. This small sprocket wheel 10 is idle on the shaft 6 that carries it, and any conventional or well known means of operating a clutch mechanism is employed to engage said sprocket wheel to revolve shaft 6 and gear 7 that is secured to it to communicate a revolving action to shaft 9, to which gear 8 is secured and is carried in proper alignment by a bearing bracket 30 and through a hole in throat block 22 to align pinion 8 with gear 7 to properly communicate the power derived from the rear ground contacting wheel of the wagon to which sprocket 4 is secured.

To more clearly show the operation of the cutting mechanism I have shown cutter 26 (Fig. 1,) raised up under bracket 23 to expose throat 26a; but in operation this cutter rests on block 22 over throat 26a to bring the cutting edge 27 (Fig. 2,) of the cutter so it will cut the stalks of kafir corn that enter throat 26a.

The wings 28 carried by cutter 26 extend upwardly and at an angle a short distance back of the cutting edge 27 so that immediately after a stalk of kafir corn is cut it will be engaged by a wing 28 and the rapid revolving action of the same will throw the stalk and the head of kafir corn it carried into the wagon bed if the stalk is not too long.

For long stalks that extend too far down for the wings 28 on the cutter 26 that is set to cut and throw only nominal lengths of stalks I employ an inverted cutter placed far enough above the lower one to not interfere with the short stalked heads, to knock them in the direction the cutter and thrower throws them so they will be delivered into the wagon bed. Thus it may be seen that a normal length of stalk will not require the knocker, carried on the same shaft above the cutter; but since some fields of kafir corn have a few tall stalks that require a knocker to aid in throwing them into the wagon bed the inverted cutter is kept in place, while the elevation of the throat block 22 is set to suit the greater portion of the stalks as they stand in the field.

It may also be seen that the operator, riding in the wagon, may adjust throat block 22 up or down to suit the crop being harvested while the wagon is in motion, through lever 16 (Figs. 1 and 3,) that is pivoted near its bottom at 17 in a member 18 subtended from angle 11, which, through link 15, engages raising arms 13, each of which are pivoted at 14 to angles 11 by a bolt or pin extending through both angles for rigidity, and arms 13 are also pivoted near their bottoms at 19 to a connecting bar 20 which communicates the same movement to each raising arm to raise throat block 22 vertically while keeping it horizontal and, in any position, it may be held by lever 16 which is provided with the well known quadrant and latch for the purpose.

In Fig. 1, throat block 22 is at its uppermost position and arms 13 are standing vertical, while, in Fig. 3, throat block 22 is at very nearly its lowest position and raising arms 13 nearly horizontal.

It may be seen from the above description of the parts of my invention that the opening 12, Figs. 1 and 3, is provided on a wagon shown to harvest fields of kafir corn of any height near normal; but for higher or shorter kafir corn a vehicle with larger or smaller wheels can be used, or the wagon bed may be blocked up over the axles for varying the height of throat block 22 to a desired general elevation; and for specially uneven fields the raising and lowering mechanism comes into use to adjust to the field while in motion and greatly facilitate the process of harvesting and hauling to storage any field of kafir corn by one man.

The cutter and thrower, Fig. 2, may be made of tool steel and hardened as high duty gears are hardened, and make a more wearable member by using a spacer 25, (Figs. 1 and 3,) that is not attached to the cutter member which has a key 29 that is slidable in keyway 24 of shaft 9 so it will revolve with the said shaft and also to align it when inverted as a knocker to properly knock the stalks when the thrower is throwing them to successfully load long stalked heads into the wagon bed. Spacers 25 are longer than the wings 28 of the cutters to space them free below and above bracket 23 for their freedom in revolving and yet closing the space between them so that a head of kafir corn cannot pass between the upper and lower wings.

Having thus described the operation of my invention, the means of mounting it, which may differ broadly, without departing from the principles involved in my invention, may be accomplished by securing two bearing brackets 2 to the under side of a wagon bed, the fastenings for which should pass through and also secure outwardly extending angled 3 on top of which are secured parallel angles 11 one on each side of shaft 9 to carry raising arms 13, link 15, bar 20 and setting lever 16 and its quadrant, near the side of the wagon but out far enough so the wagon wheels will not pass over the row of kafir corn but so throat 26a will gather it into the cutting position. Rods 21 secured to throat block 22 extend slidably through angles 11 and serve as a guide and stiffener to the throat block which may be secured more rigidly to the wagon bed except while being raised or lowered, by any means without departing from my invention since it consists of a particular type of raising and lowering mechanism to bring into position a feeding throat and cutting and throwing mechanism to harvest variable heights of kafir corn with a new and useful cutter, thrower and knocker composed of one member in two positions.

Because of the varying requirements in mounting my invention on different types of vehicles, or on other harvesting machinery may necessitate replacing angles 3 or relocating them where throat 26a will not be interfered with, and, therefore, the exact type of hanger for the gears and driving sprockets may vary; but the principle deriving power from any means outside of my invention, such as from one of the ground contacting wheels of a wagon is the communication of power from some outside source to the gears 7 and 8 as they are now shown to relate to shaft 9 of my invention.

What I claim and desire to secure by Letters Patent is:—

1. In a structure of the class described, in combination with means for carrying attachment to the side of a conventional wagon, a pair of angle members carrying mounted thereon a pair of raising arms pivoted to said angles and operated by a lever that retains them in a plurality of positions under a throat block that carries on its upper surface, a cutting and throwing mechanism, substantially as shown and described.

2. In a structure of the class described, the combination with carrying means for attaching to the side of a conventional wagon that supplies the power for operation, of a cutting and throwing member carried under a stabilizing bracket on a shaft, through said bracket, to which said member, serving as a cutter and knocker, is keyed for rotation thereby, with an exactly similar member, serving as a knocker, is inverted and carried above said bracket, on said shaft, and keyed thereto, to be rotated thereby with its wings in alignment with the wings of the lower member so that the wings of each member will form a wall so closely spaced apart by spacers above and below said bracket and between said cutter and knocker and said knocker that a head of kafir corn cannot pass between said wings thus aligned, substantially as shown and described.

In testimony whereof I affix my signature.

DAVID HENRY MARTIN.